United States Patent
Kaibach et al.

(10) Patent No.: US 6,505,692 B1
(45) Date of Patent: Jan. 14, 2003

(54) DRILL FOR FORMING UNDERCUTS IN BORES

(75) Inventors: Werner Kaibach, Buchloe (DE); Stefan Raber, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/615,539

(22) Filed: Jul. 13, 2000

(30) Foreign Application Priority Data

Jul. 22, 1999 (DE) .......................... 199 34 430

(51) Int. Cl.⁷ .......................... F21B 21/00; B23B 51/00
(52) U.S. Cl. .................. 175/211; 175/220; 175/320; 408/159; 408/180
(58) Field of Search .................. 175/210, 211, 175/220, 320; 408/153, 159, 180

(56) References Cited

U.S. PATENT DOCUMENTS

| | | | |
|---|---|---|---|
| 4,446,934 A | * 5/1984 | Muller | 175/286 |
| 4,964,476 A | * 10/1990 | Fischer | 175/213 |
| 4,989,681 A | * 2/1991 | Lohmuller et al. | 175/398 |
| 5,031,709 A | * 7/1991 | Fischer | 175/325 |
| 5,092,717 A | * 3/1992 | Fischer | 408/59 |

* cited by examiner

Primary Examiner—David Bagnell
Assistant Examiner—Jennifer Dougherty
(74) Attorney, Agent, or Firm—Sidley Austin Brown & Wood, LLP

(57) ABSTRACT

A drill for forming undercuts in cylindrical bores formed in stone or concrete and including a drilling member (2;22) having a stem (3;23) provided, at its opposite longitudinal ends, respectively, with a shank (4;24) receivable in a chuck of a hand-held drilling tool and a cutting head (5;25) with abrasive cutting bodies, and a sleeve (7;27) for receiving the drilling member (2;22) and having, at its end adjacent to the shank (4;24), a radial collar (8;28), a drag bearing (11) arranged in side the sleeve for supporting the drilling member (2;22), and at least one opening (15;35, 36, 37) formed in a front, in a direction toward the cutting head (5;25), section of the sleeve and spaced axially from the drag bearing (11) by a distance (a) amounting to from about 0.05×D to about 0.6×D, where D is an outer diameter of the sleeve in the drag bearing region of the sleeve.

9 Claims, 2 Drawing Sheets

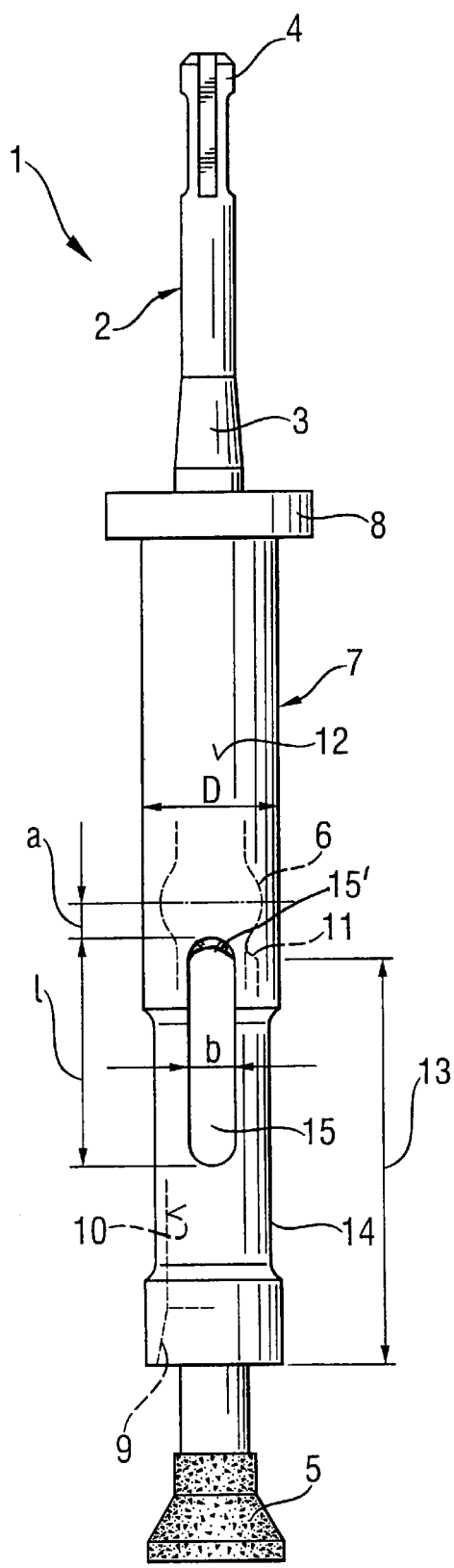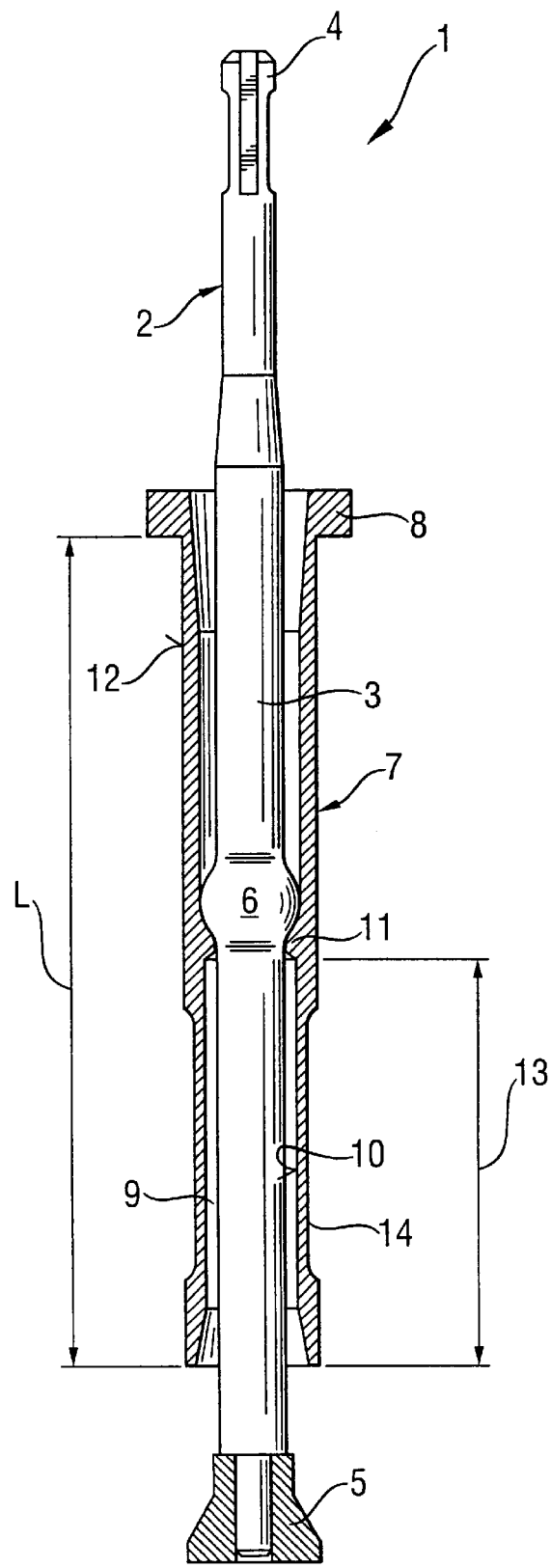

DRILL FOR FORMING UNDERCUTS IN BORES

BACKGROUND OF THE INVENTION

1. Field of the Invention

The present invention relates to a drill for forming undercuts in cylindrical bores formed in stone or concrete and including a drilling member having a stem provided, at one of its longitudinal ends, with a shank receivable in a chuck of a hand-held drilling tool and, at another of its longitudinal ends, with a cutting head with abrasive cutting bodies, and a sleeve for receiving the drilling member and having, at its end adjacent to the shank, a radial collar and a drag bearing arranged inside the sleeve for supporting the drilling member.

2. Description of the Prior Art

For attachments of constructional parts subjected to high tensile loads, in particular for safe attachments, often formlocking anchoring of the fastening elements is used. With the formlocking anchoring, the generation of expansion forces, upon application of a load, is prevented to a most possible extent. With the formlocking anchoring, smaller than with conventional anchoring, distances between axes and edges can be maintained. With the formlocking anchoring, undercut-engaging anchors, which usually have an anchor rod with a head portion widening in a setting direction and a sleeve axially displaceable over the anchor rod, are used. At its end adjacent to the head portion of the anchor rod, the sleeve has a plurality of expansion tabs which expands radially upon displacement of the sleeve over the head portion and which engage in a preliminary formed undercut, forming a formlocking connection with the bore wall.

For forming an undercut in a preliminary formed substantially cylindrical bore in stone or concrete, a drill such as disclosed, e.g., in German Patent No. 3,143,462, is used. The drilling member of the drill has, at one of its end, a shank receivable in a chuck of a hand-held drilling tool, and, at its opposite end, a cutting head with abrasive cutting bodies. The drilling member is supported by a drag bearing in a sleeve provided with a radial collar for supporting the drill on the edge of a bore. The drag bearing is formed as a radial circular projection extending from the inner wall of the sleeve and spaced from the collar. During the formation of the undercut, the drilling member performs stirring movements. The abrasive cutting bodies on the cutting head cause disintegration of the bore wall, forming more or less fine particles and fragments. During formation of undercuts in horizontal bores or in overhead bores, the comminuted particles and fragments can reach the sleeve and be retained there, preventing the pivotal movement of the drilling member. This makes the formation of an undercut more difficult or even impossible.

Accordingly, an object of the present invention is to provide a drill for forming an undercut in which the drawbacks of the known drill are eliminated.

Another object of the present invention, is to provide a drill for forming undercuts and which can be used simply and reliably.

SUMMARY OF THE INVENTION

These and other objects of the present invention, which will become apparent hereinafter, are a achieved by providing a drill for forming undercuts in cylindrical bores formed in stone or concrete and including a drilling member having a stem provided, at one of its longitudinal ends, with a shank receivable in a chuck of a hand-held drilling tool and, at another of its longitudinal ends, with a cutting head with abrasive cutting bodies. The drill is supported in a drag bearing inside of sleeve having a through-bore and, at its end adjacent to the shank, a radial collar.

The sleeve has at least one through-opening formed in a front, in a direction toward the cutting head, section of the sleeve and spaced axially from the drag bearing by a distance amounting to from about 0.05×D to about 0.6×D, preferably, from 0.2×D to 0.4×D, where D is an outer diameter of the sleeve in the region of the drag bearing.

The selected location of at least one opening insures that no drillings or drilling dust reaches the region of the drag bearing. The drillings or fragments, which reach the sleeve during horizontal or overhead formation of an undercut, fall out through the through-opening. The sleeve would not be filled with drillings or fragments which can hinder the undercut-forming process. The drilling dust, which adheres to the inner wall of the sleeve, can be loosened by knocking on the sleeve and exit through the through-opening. The drill has a simple construction and does not differ in its main function from the conventional drills. Thus, the user need not familiarize himself with a new technique.

Advantageously, the at least one through-opening has an axial length which is larger than an opening width in a circumferential direction of the sleeve. The axial length of the through-opening amounts to from 0.05×L to 0.5×L, preferably, from 0.1×L to 0.4×L. L is an operational length of the drill defined by a distance from the radial collar to an end of the sleeve adjacent to the cutting head. The through-opening width amounts to from 0.1×D to 0.7×D, preferably from 0.2×D to 0.5×D. At these dimensions, a reliable removal of the formed concrete particles from the sleeve is insured.

According to one of the embodiments of the invention, the sleeve has a plurality of through-openings arranged axially one after another in the sleeve front section. The openings extend over a length of the sleeve which is larger than an opening width in a circumferential direction of the sleeve. This length amounts to from 0.05×L to 0.5×L, preferably from 0.1×L to 0.4×L, where L is an operational length of the drill defined by a distance from the radial collar to an end of the sleeve adjacent to the cutting head. The opening width amounts to from 0.1×D to 0.7×D, preferably, from 0.2×D to 0.5×D.

To improve the removal of drillings, a plurality of through-openings are distributed over the sleeve circumference. The through-opening can have the same shape. However, advantageously, the through-openings have a different geometry to take into account different sizes of drilling particles and fragments. The removal of the drillings can further be improved when a limiting surface of a through-opening adjacent to the drag bearing has a chamfer. The chamfer guides the drilling outside.

The novel features of the present invention, which are considered as characteristic for the invention, are set forth in the appended claims. The invention itself, however, both as to its construction and its mode of operation, together with additional advantages and objects thereof, will be best understood from the following detailed description of preferred. embodiments, when read with reference to the accompanying drawings.

BRIEF DESCRIPTION OF THE DRAWINGS:

The drawings show:

FIG. 1 a schematic side view of a first embodiment of a drill according to the present invention;

FIG. 2 a cross-sectional view of the drill shown in FIG. 1; and

DETAILED DESCRIPTION OF THE PREFERRED EMBODIMENTS

Figure 3:
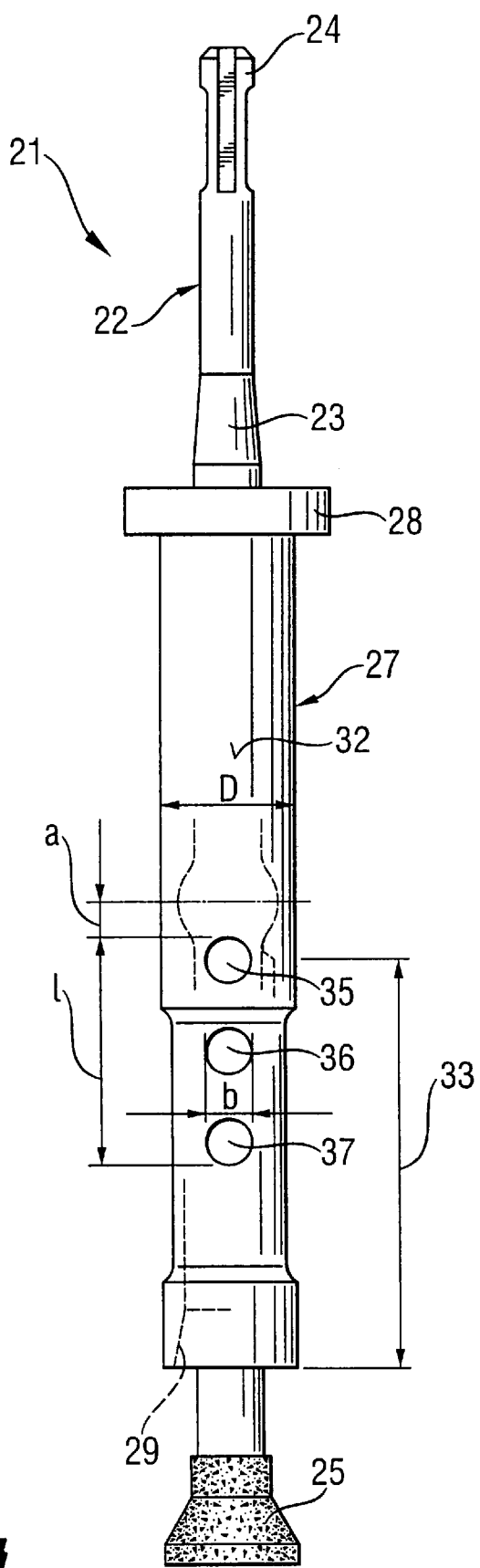
FIG. 3 a schematic side view of a second embodiment of a drill according to the present invention.

A drill according to a first embodiment of the present invention, which is shown in FIGS. 1–2, is designated generally with a reference numeral 1. The drill 1 includes a drilling member 2 the stem 3 of which has at one of its longitudinal ends a shank 4 insertable in a chuck of a hand-held drilling tool. At its another opposite longitudinal end, there is located a cutting head 5 provided with abrasive cutting bodies. The abrasive cutting bodies can be formed, e.g., as hard metal cutters or be formed with a layer of abrasive particles of hard metal and/or diamond. The drilling member 2 is guided in an axial through-bore 9 of a substantially cylindrical sleeve 7. The stem 3 has a thickened region 6 with which it is supported in a drag bearing 11. The drag bearing 11 is formed as an annular projection extending from the inner wall of the sleeve 7. The sleeve 7 has, in its end region adjacent to shank 4, an annular collar 8 which serves for supporting the sleeve on a surface of a constructional component in a bore of which the sleeve 7 is inserted. The axial length of the sleeve 7 from the bearing surface of the collar 8 to the end of the sleeve 7 adjacent to the cutting head 5 is defined as an operational length L. The outer surface 12 of a front section 13 of the sleeve 7, which extends from the drag bearing 11 to the end of the sleeve 7 adjacent to the cutting head 5, has a reduced diameter portion 14 that takes into account not always exactly cylindrical course of the bore formed in a constructional component.

According to the present invention, the portion 14 of the front section 13 has at least one through-opening 15. The through-opening 15 ends in the region of the drag bearing 11 and is spaced from the drag bearing 11 by a distance a which amounts to from about 0.05×D to 0.6×D, preferably 0.2×D to 0.4D, where D is an outer diameter of the sleeve 7 in the region of the drag bearing 11. The through-opening 15 extends over an axial region 1 of the front section 13, where $0.05 \times L \leq 1l \leq 10.5 \times L$, preferably, $0.1 \times L \leq 1l \leq 10.4 \times L$. The through-opening 15 has, viewed in the circumferential direction of the sleeve 7, a width b which is smaller than the axial length 1 of the extension of the through-opening 15 in the front section 13, where $0.1 \times D \leq 1b \leq 1$ $0.7 \times D$, preferably, $0.2 \times D \leq 1b \leq 10.5 \times D$.

The drill of the embodiment shown in FIG. 3 is designated with a reference numeral 21. The embodiment of the drill shown in FIG. 3 substantially corresponds to that of FIGS. 1–2. Correspondingly, all components and elements of the drill 21 correspond to those of FIGS. 1–2 and are designated with the same reference numerals increased by 20. The drilling member, its stem, and the guide sleeve are designated with corresponding reference numerals 22, 23, and 27. According to the second embodiment, the front section 33 of the sleeve 27 is provided with several through-openings 35, 36, 37 arranged one after another. The through-openings 35, 36, 37 are all arranged in an axial region 1 of the front section 33 of the sleeve 27, where $0.05 \times L \leq 1l \leq 10.5 \times L$, preferably, $0.2 \times L \leq 1l \leq 11.4 \times L$. Each of the through-openings 35, 36, 37 has a width b which is smaller than 'the length 1 of the axial region of the front section 33 and which amounts to $0.2 \times D \leq 1b \leq 17D$, preferably, $0.2 \times D \leq 1b \leq 10.5 \times D$.

The present invention was explained with reference to the embodiments of an inventive drill in which the sleeve is provided with one or several axially extending through-openings. It should be understood that further openings can be provided over the sleeve circumference. The through-openings can be of different shapes. Advantageously, the through-openings have, on their limiting surfaces which are located adjacent to the drag bearing, a chamfer such as a chamfer 15' (FIG. 1); which provides for improved removal of drillings.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A drill for forming undercuts in cylindrical bores formed in stone or concrete, comprising a drilling member (2;22) having a stem (3;23) provided, at one of its longitudinal ends, with a shank (4;24) receivable in a chuck of a hand-held drilling tool and, at another of its longitudinal ends, with a cutting head (5;25) with abrasive cutting bodies; and a sleeve (7;27) for receiving the drilling member (2;22) and having, at an end thereof adjacent to the shank (4;24), a radial collar (8;28), a drag bearing (11) arranged inside the sleeve for supporting the drilling member (2;22), and at least one through-opening (15;35, 36, 37) formed in a front, in a direction toward the cutting head (5;25), section (13;33)of the sleeve and spaced axially from the drag bearing (11) by a distance (a) amounting to from about 0.05×D to about 0.6×D, where D is an outer diameter of the sleeve (7;27) in a region of the drag bearing (11).

2. A drill according to claim 1, wherein the at least one through-opening (15;35) is spaced from the drag bearing (11) by a distance (a) amounting to from 0.2×D to 0.4×D.

3. A drill according to claim 1, wherein the at least one through-opening (15) has an axial length (1) which is larger than an opening width (b) in a circumferential direction of the sleeve (7) and amounts to from 0.05×L to 0.5×L, where L is an operational length of the drill (1) defined by a distance from the radial collar (8) to an end of the sleeve (7) adjacent to the cutting head (5), and the opening width (b) amounts to from 0.1×D to 0.7×D.

4. A drill according to claim 3, wherein the axial length (1) of the through-opening amounts to from 0.1×L to 0.4×L, and the opening width (b) amounts to from 0.2×D to 0.5×D.

5. A drill according to claim 1, wherein the sleeve (37) has a plurality of through-opening (35, 36, 37) arranged axially one after another in the front section (33) of the sleeve (27) over an axial length (i) of the sleeve (27) which is larger than an opening width (b) in a circumferential direction of the sleeve (27) and amounts to from 0.05×L to 0.5×L, where L is an operational length of the drill (1) defined by a distance from the radial collar (28) to an end of the sleeve (27) adjacent to the cutting head (25), and the opening width (b) amounts to from 0.1×D to 0.7×D.

6. A drill according to claim 5, wherein the axial length (1) of the sleeve (27), in which the plurality of through-openings (35, 36, 37) is formed, amounts to from 0.1×L to 0.4×L, and the opening width (b) amounts to from 0.2×D to 0.5×D.

7. A drill according to claim 1, wherein the sleeve has a plurality of through-openings distributed in a circumferential direction of the sleeve.

8. A drill according to claim 7, wherein the through-openings have a different geometry.

9. A drill according to claim 1, wherein the at least one through-opening (15) has, on a limiting surface thereof adjacent to the drag bearing (11), a chamfer.

* * * * *